US005078557A

United States Patent [19]

McCracken

[11] Patent Number: 5,078,557

[45] Date of Patent: Jan. 7, 1992

[54] LIMIT STOPS FOR A ROUTER DEPTH OF CUT ADJUSTMENT MECHANISM

[75] Inventor: Robert E. McCracken, Easley, S.C.

[73] Assignee: Ryobi Motor Products Corp., Pickens, S.C.

[21] Appl. No.: 661,823

[22] Filed: Feb. 28, 1991

[51] Int. Cl.[5] .......... B23C 1/20; B27C 5/10

[52] U.S. Cl. .......... 409/182; 144/134 D; 144/136 C

[58] Field of Search .......... 409/178, 182, 209, 210, 409/214; 144/134 D, 136 C; 408/241 S

[56] References Cited

U.S. PATENT DOCUMENTS

| | | | |
|---|---|---|---|
| 2,842,173 | 7/1958 | Turner et al. | 144/136 C |
| 2,988,119 | 6/1961 | Godfrey et al. | 144/136 C |
| 3,363,510 | 1/1968 | Burrows et al. | 144/136 C |
| 4,640,324 | 2/1987 | Lounds | 409/182 X |

*Primary Examiner*—Z. R. Bilinsky
*Attorney, Agent, or Firm*—David L. Davis

[57] ABSTRACT

A portable electric router having a depth of cut adjustment mechanism including an adjustment ring which engages a screw thread on the motor housing and rotationally engages the router base. There is further provided an arrangement for preventing relative rotation between the motor housing and the base. The adjustment ring is formed as a split ring with projections adjacent opposite sides of the split, each with a frustoconical camming surface. A circular clamp knob mounted for threaded rotation on a bolt passing through the projections radially with respect to the router motor housing bears against the camming surfaces so as to squeeze the ring in order to effect a clamping action as the knob is moved inwardly. In order to provide limit stops for preset depths of cut, a pair of stop rings are provided which are angularly rotatable on the router base. Each of the stop rings includes an interference projection and the adjustment ring has a tab fixedly mounted thereon which extends to a point between the interfering projections. The stop rings may be fixed to the router base to limit the range of angular rotation of the adjustment ring.

15 Claims, 8 Drawing Sheets

LIMIT STOPS FOR A ROUTER DEPTH OF CUT ADJUSTMENT MECHANISM

BACKGROUND OF THE INVENTION

This invention relates to portable electric router tools and, more particularly, to an arrangement for providing adjustable limit stops for the router's depth of cut adjustment mechanism.

When using a router, the operator often desires to quickly change the depth of cut from one preset depth to another preset depth. In the particular router depth of cut adjustment mechanism considered herein, the router includes a motor housing with an external cylindrical portion and a base with a cylindrical bore for slidably receiving therein the cylindrical portion of the motor housing. A depth of cut adjustment ring engages the motor housing and the base and is rotatable to effect relative longitudinal displacement of the motor housing with respect to the base, the router further including an arrangement for preventing relative rotation between the motor housing and the base. It is an object of the present invention to provide an arrangement for adjustably setting limits on the range of angular rotation of the rotatable depth of cut adjustment ring.

SUMMARY OF THE INVENTION

The foregoing, and additional, objects are attained in accordance with the principles of this invention by providing a pair of stop rings, each having an interference projection, and each being independently rotatably mounted on the router base. These rings may be set with their interference projections at any desired angular orientation on the base. The depth of cut adjusting ring has a tab fixedly mounted thereon which extends to a point between the interfering projections so as to limit the angular rotation of the adjustment ring.

BRIEF DESCRIPTION OF THE DRAWINGS

The foregoing will be more readily apparent upon reading the following description in conjunction with the drawings in which like elements in different figures thereof have the same reference numeral applied thereto and wherein.

DETAILED DESCRIPTION

Figure 1:
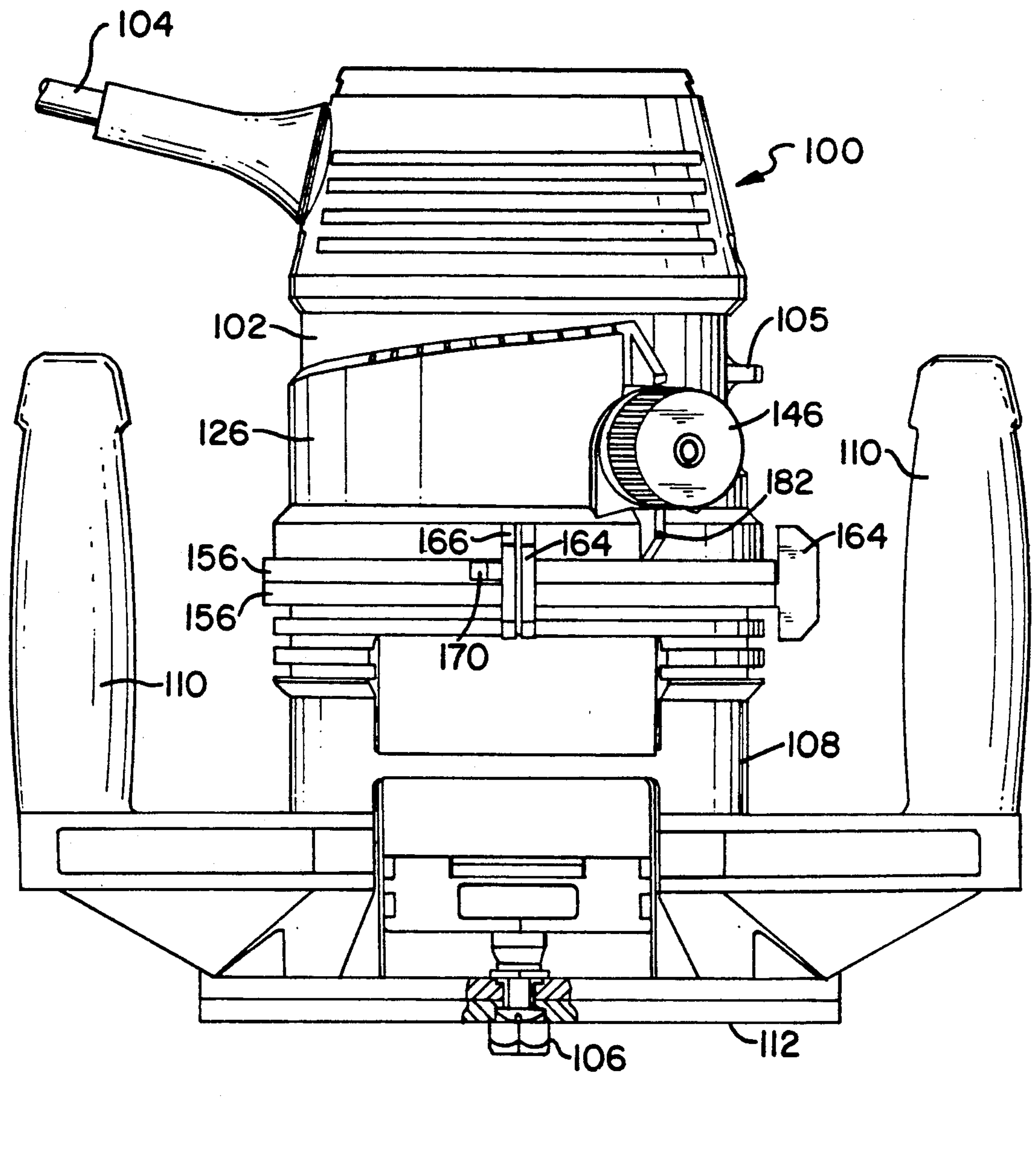
FIG. 1 is an elevational view, partially cut away, showing a router constructed in accordance with this invention.

Referring now to the drawings, FIG. 1 illustrates a router, designated generally by the reference numeral 100, which is constructed in accordance with the principles of this invention. The router includes a motor housing 102 which contains a motor (not shown) powered through a switch 105 and a line cord 104 and having a rotating output shaft on which is mounted a collet 106 for holding a cutting tool (not shown). The motor, its mounting within the motor housing 102, and the cutting tool collet form no part of the present invention and will not be described in any further detail.

The motor housing 102 is supported in a base 108, in a manner to be described in full detail hereinafter, which includes a pair of handles 110 by means of which an operator can manipulate the router 100 along a work surface. The motor housing 102 is supported in the base 108 so that the cutting tool can extend outwardly beyond the lower support surface 112 of the base 108. In operation of the router 100, the lower support surface 112 rests on the upper surface of the work and the distance that the cutting tool extends beyond the lower support surface 112 determines the depth of cut of the router 100. This depth of cut may be adjusted by varying the relative longitudinal position of the motor housing 102 relative the base 108.

Figure 2:
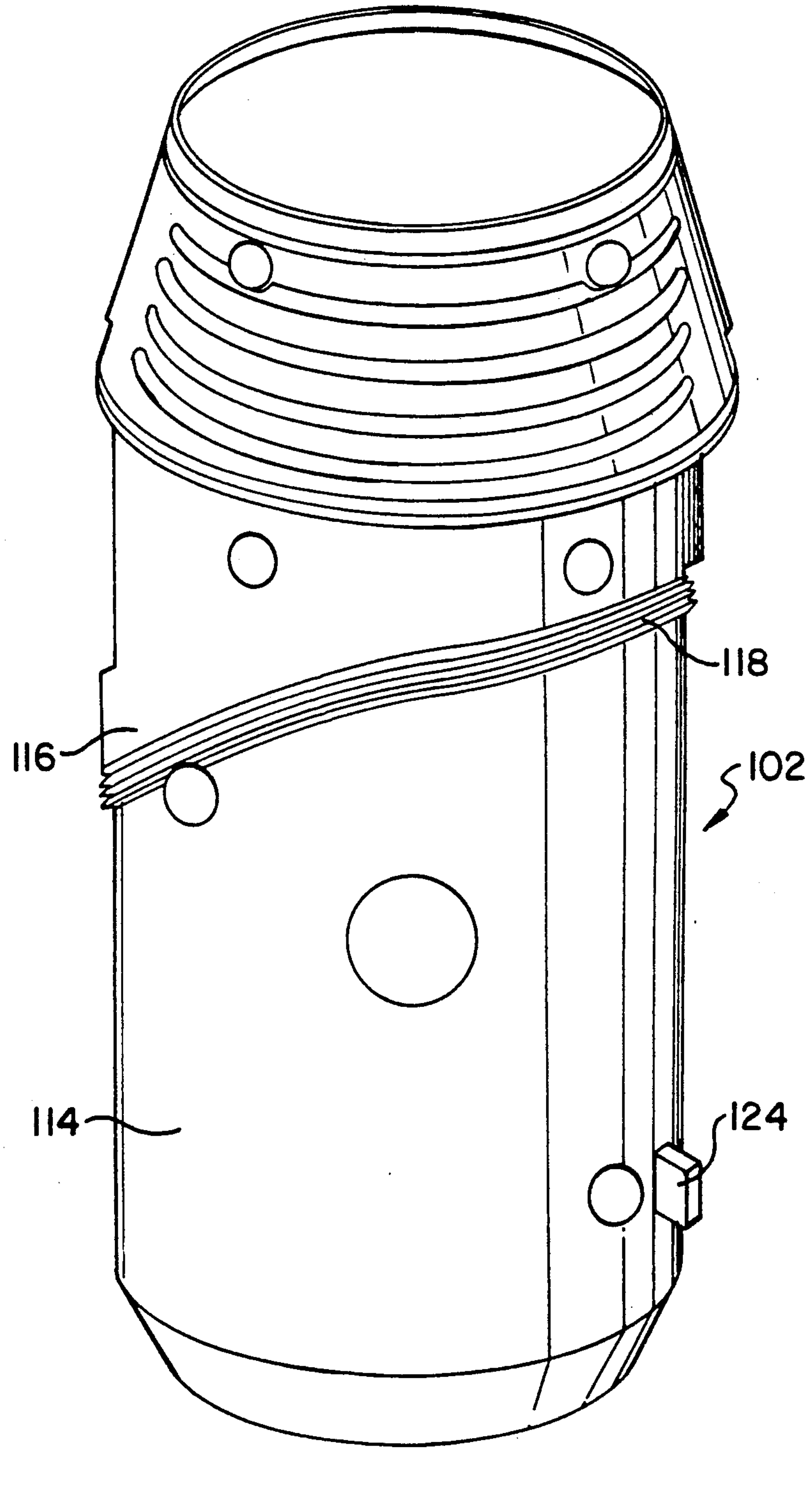
FIG. 2 is a perspective view of the motor housing of the router shown in FIG. 1.

As is best shown in FIG. 2, the motor housing 102 is generally cylindrical in external configuration. A first longitudinal region 114 of the motor housing 102 has a generally smooth surface, while a second longitudinal region 116 is formed with an external screw thread 118.

Figure 3:
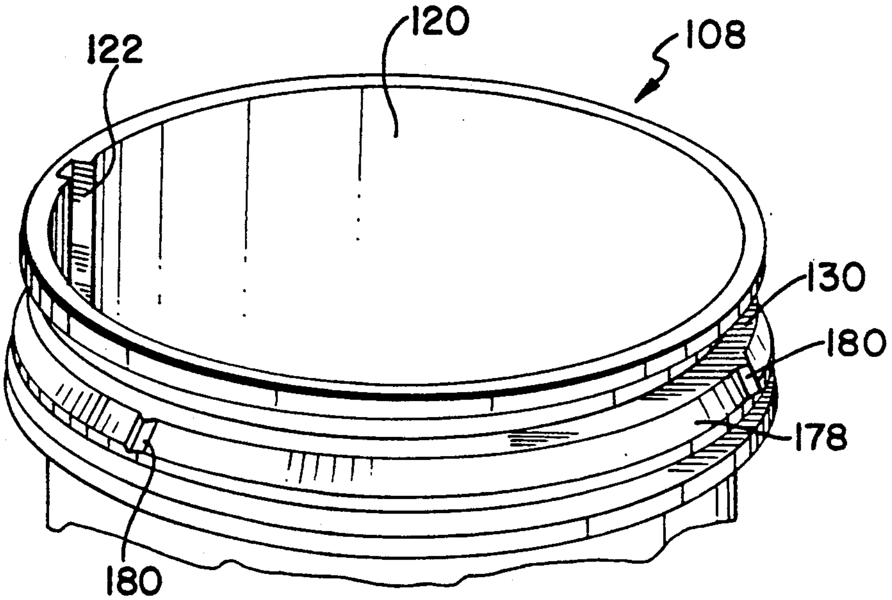
FIG. 3 is a perspective view of the top central portion of the base of the router shown in FIG. 1.

As shown in FIG. 3, the base 108 has a cylindrical bore 120 which is sized to slidably receive therein the smooth longitudinal region 114 of the motor housing 102. In order to prevent relative rotation between the motor housing 102 and the base 108, the cylindrical bore 120 of the base 108 is formed with a longitudinal groove 122 and the motor housing 102 is formed with a projection 124 complemental thereto.

The present invention is concerned with the arrangement for adjusting the depth of cut of the router 100. Accordingly, there is provided an adjustment ring 126 which engages both the screw thread 118 on the motor housing 102 and also rotationally engages the base 108. Since the motor housing 102 cannot partake of rotational motion relative the base 108 because of the groove 122 and the projection 124, rotation of the adjustment ring 126 effects longitudinal displacement of the motor housing 102 relative the base 108, which varies the distance that the cutting tool projects beyond the lower support surface 112. Subsequent clamping of the adjustment ring 126 to the motor housing 102 and the base 108 maintains the desired depth of cut adjustment.

Thus, the adjustment ring 126 is formed with an internal screw thread 128 (FIG. 5) which is complemental to the external screw thread 118 of the motor housing 102. The base 108 is formed with an annular groove 130 at its upper end and the adjustment ring 126 is formed with an inwardly directed projection, or flange, 132 which engages the annular groove 130. Accordingly, rotation of the adjustment ring 126 does not affect its longitudinal position with respect to the base 108 but due to the pitch of the screw threads 118, 128, the motor housing 102 is longitudinally displaced.

Figure 4:
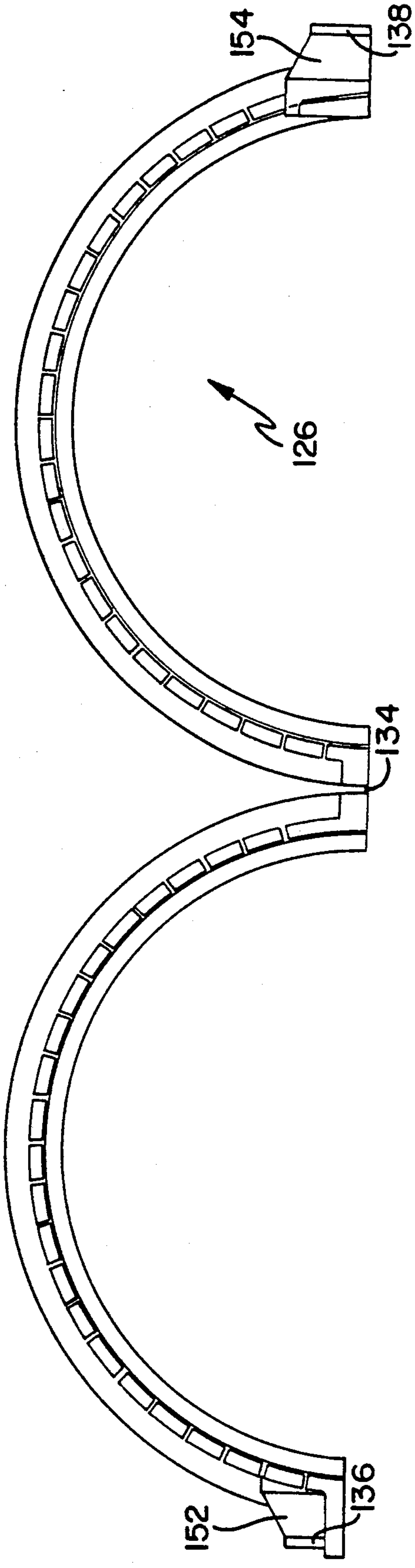
FIG. 4 is a top plan view of the adjustment ring of the router shown in FIG. 1, shown in its fully open state.
Figure 5:
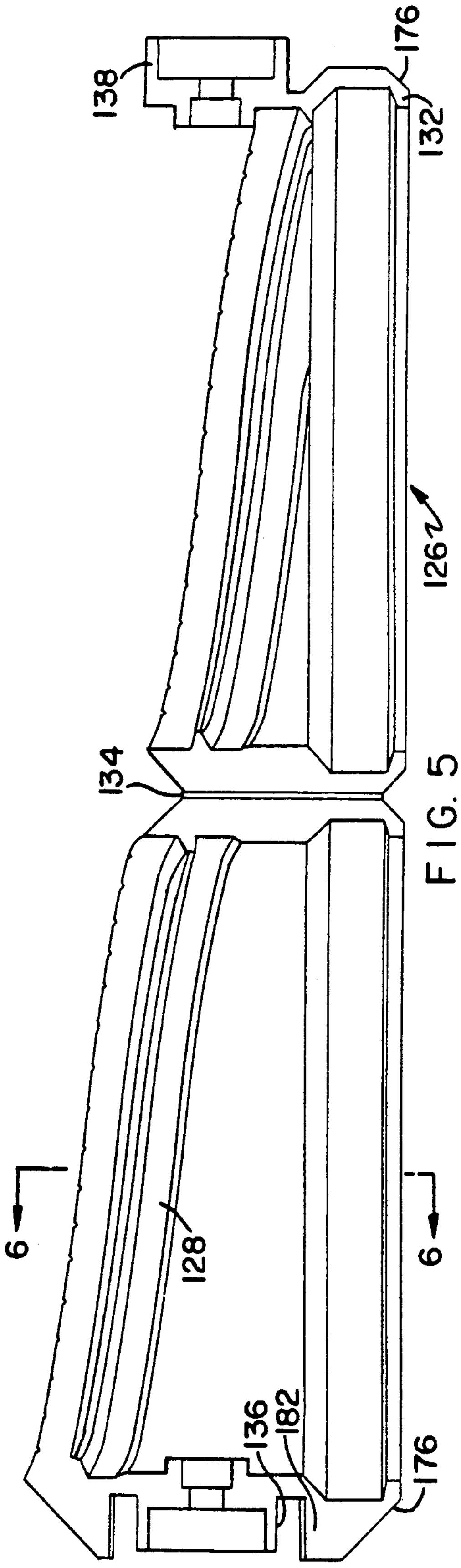
FIG. 5 is an elevational view of the opened adjustment ring shown in FIG. 4.
Figure 6:
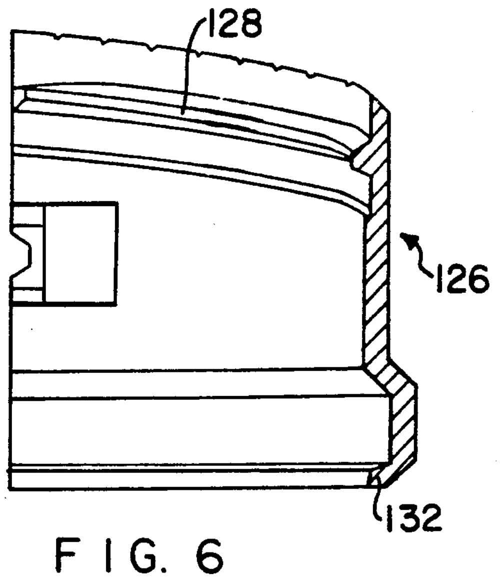
FIG. 6 is a cross section of the adjustment ring taken along the line 6—6 in FIG. 5.

Preferably, the adjustment ring 126 is a split ring hinged at 134, as best shown in FIGS. 4 and 5. Each half of the adjustment ring 126 is generally semi-circular in plan. This allows for economical molding of the adjustment ring 126 and easy assembly onto the router 100. The adjustment ring 126 is preferably molded of a plastic material so that it is inherently resilient.

Figure 7:
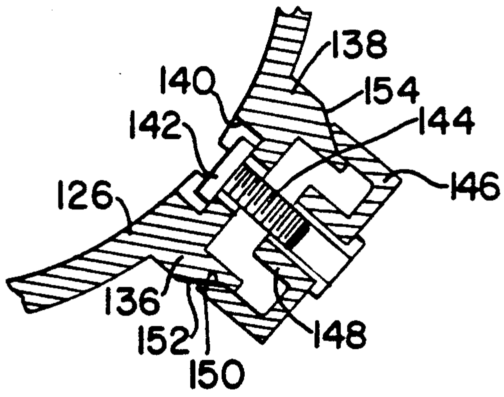
FIG. 7 is a cross sectional view showing details of the clamping knob on the adjustment ring.
Figure 7A:
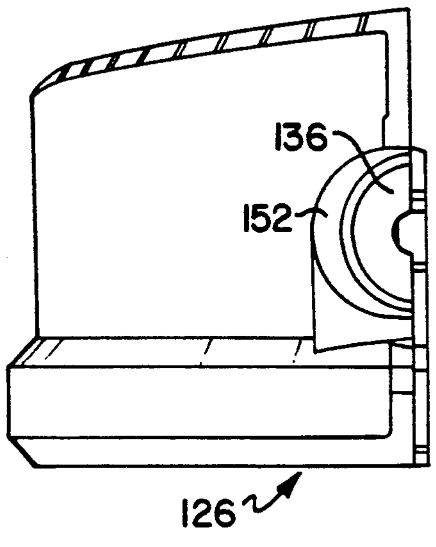
FIG. 7A is a detail of the surface of the adjustment ring clamp projection.

After the adjustment ring 126 is rotated to achieve a desired depth of cut, the ring 126 must be clamped to the motor housing 102 and the base 108 to maintain that depth of cut setting. Toward that end, the adjustment ring 126 is formed with a first projection 136 adjacent a first of the opposed ends flanking the split of the ring 126 and a second projection 138 adjacent the other opposed end flanking the split of the ring 126. Preferably, the projections 136, 138 are mirror image halves of a frusto-conical structure. When pressed together, the projections 136, 138 provide a recess 140 which holds the head 142 of a threaded member 144 against rotation. A circular clamp knob 146 is provided. The knob 146 has an internally threaded boss 148 which is threadedly engaged with the threaded member 144, as is best shown in FIG. 7. The clamp knob 146 has an inner camming surface 150 which bears against the frusto-conical surfaces 152, 154 of the projections 136, 138, respectively. Thus, clockwise rotation of the clamp knob 146 on the threaded member 144 moves the clamp knob 146 closer to the motor housing 102 to draw the projections 136, 138 toward each other, thereby closing the gap between the opposed ends of the adjustment ring 126 and clamping the adjustment ring 126 to the motor housing 102 and the base 108. Conversely, counterclockwise rotation of the clamp knob 146 loosens the adjustment ring 126. Since the clamp knob 146 extends away from the router 100 to a region which is free of all obstructions, it is very easily manipulated by the operator.

The clamp knob 146 is circular, with the inner camming surface 150 being beveled so that it is frusto-conical. To provide substantial engagement of the inner camming surface 150 with the surfaces 152, 154 of the projections 136, 138 of the adjustment ring 126, the surfaces 152, 154 are shaped such that at a section taken along a plane orthogonal to the threaded member 144, each of the surfaces 152, 154 describes an arc of a circle having a predetermined fixed diameter irrespective of the position of the plane along the surfaces 152, 154. The center of that circle varies linearly as the plane moves along the threaded member 144. Thus, as the clamp knob 146 is tightened on the threaded member 144 and the projections 136, 138 are moved closer together, the inner camming surface 150 always engages the same size frusto-conical surface.

Advantageously, the router 100 is arranged with adjustable limit stops for the depth of cut adjustment mechanism so that the operator can quickly change the depth of cut setting between first and second preset depths of cut. These limit stops are provided on stop rings which encircle the base 108 and which may be fixed to the base 108 in preset angular orientations. The limit stops cooperate with structure on the adjustment ring 126 to provide limits to the range of angular rotation of the adjustment ring 126.

Figure 8:
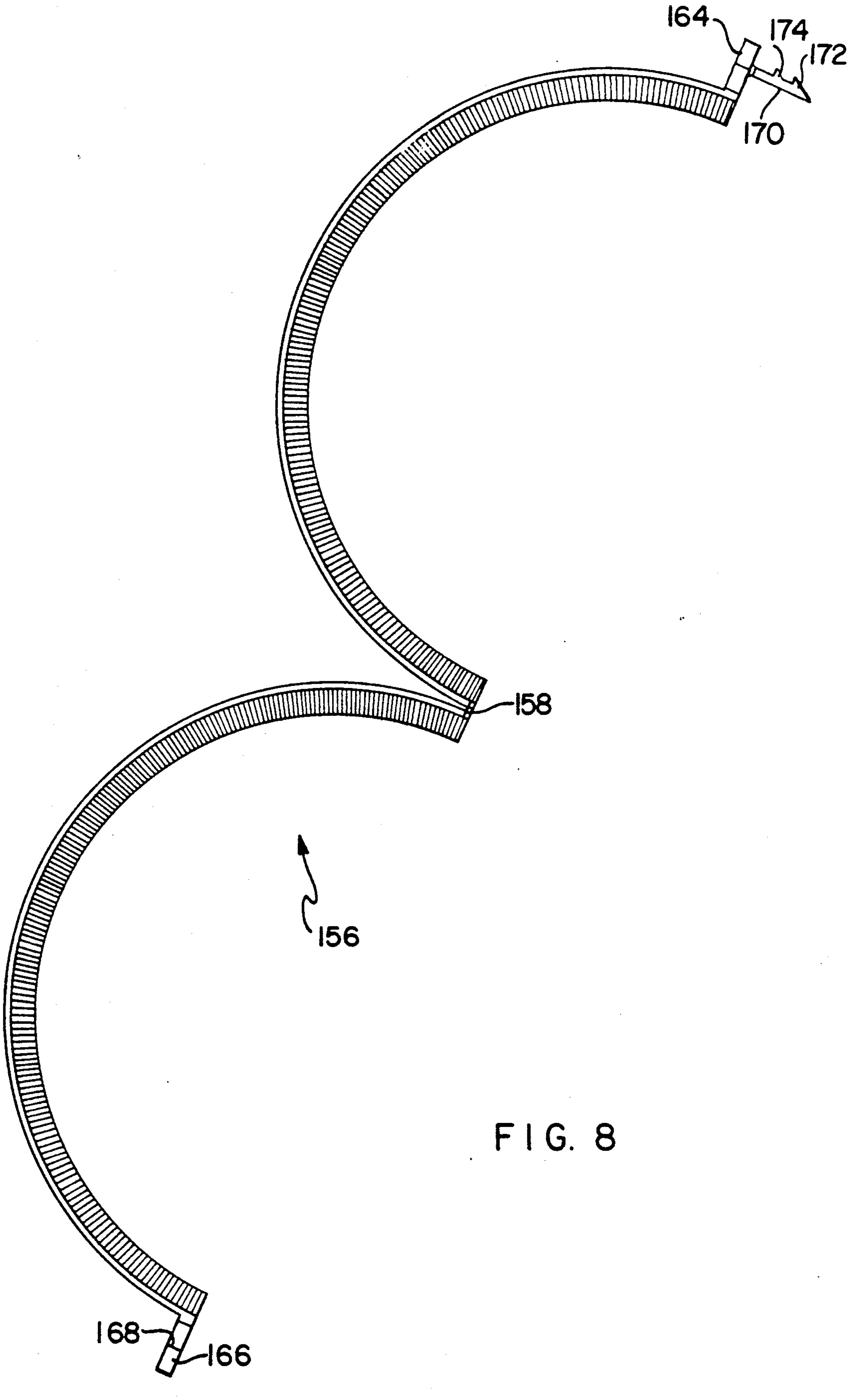
FIG. 8 is a top plan view of a stop ring of the router shown in FIG. 1, shown in its fully open state.
Figure 9:
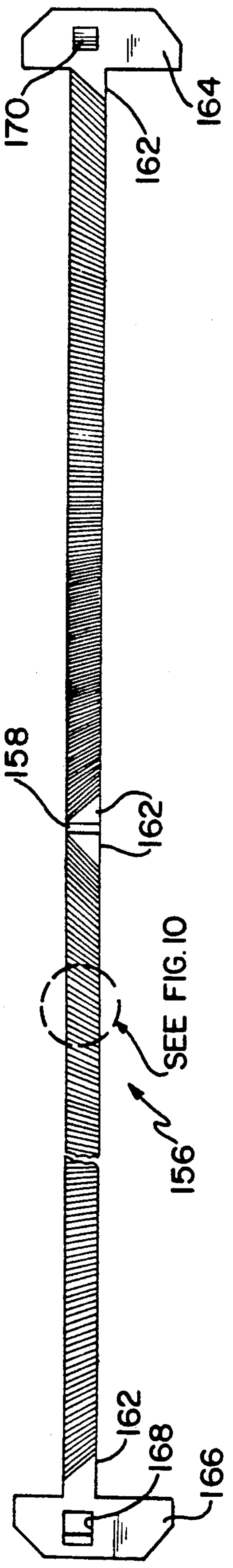
FIG. 9 is an elevational view of the opened stop ring shown in FIG. 8.
Figure 10:
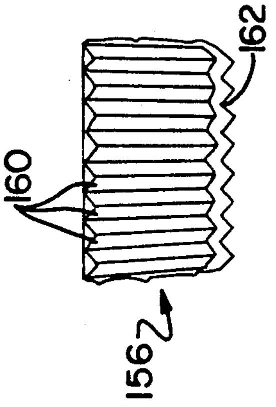
FIG. 10 is an enlarged detail of the stop ring shown in FIG. 9.

FIGS. 8–10 illustrate a stop ring 156 which may be utilized for the above-described function. A pair of such stop rings 156 are utilized, the stop rings being rotated 180° from each other when in use, as will be described in full detail hereinafter. Like the adjustment ring 126, the stop ring 156 is a split ring hinged at 158. Each half of the stop ring 156 is generally semi-circular in plan (FIG. 8) while being generally triangular in cross section as can best be seen in FIG. 11. Thus, the inner surface of the stop ring 156 is at an angle of approximately 45°. This inner surface is serrated to form a plurality of grooves 160. The wider end surface 162 of the stop ring 156 is also serrated.

The stop ring 156 is preferably molded of a plastic material so that it is inherently resilient. The stop ring 156 is formed with an interfering projection 164 at one end and an adjustment projection 166 at its other end. The projections 164, 166 are thus opposed across the opening of the split stop ring 156, and the spacing therebetween determines the overall circumference of the stop ring 156. To adjust that circumference, the adjustment projection 166 is formed with an opening 168 which is directed circumferentially of the stop ring 156. On the interfering projection 164, there is formed a tab 170 circumferentially directed toward the adjustment projection 166. The tab 170 includes a first barb 172 and a second barb 174 and is adapted for insertion through the opening 168. When the first barb 172 engages the projection 166, the circumference of the stop ring 156 is relatively large and when the second barb 174 engages the projection 166, the circumference of the stop ring 156 is smaller.

Figure 11:
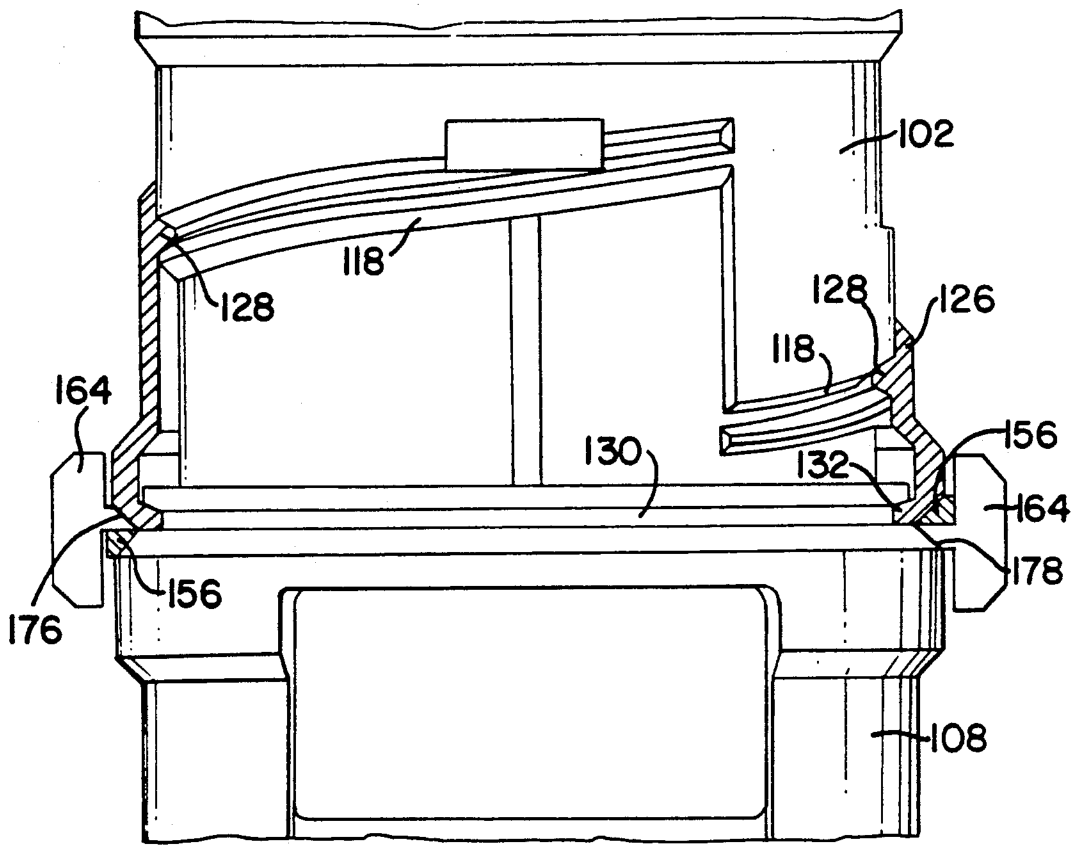
FIG. 11 is an elevational view, partly in cross section, showing how the motor housing, the base, the adjustment ring and the stop rings of the router shown in FIG. 1 fit together.

To accommodate the stop rings 156, the lower end of the adjustment ring 126 is formed with a beveled annular surface 176, as best shown in FIG. 11. The base 108 is formed with a beveled annular surface 178 adjacent the annular groove 130, so that when the adjustment ring 126 is installed on the base 108 the surfaces 176 and 178 together form a V-shaped annular groove. The pair of stop rings 156 fit within this groove, with one of the stop rings oriented 180° with respect to the other stop ring, as is best shown in FIG. 11.

To effectively fix the position of the stop rings 156 in the V-shaped annular groove, the beveled annular surface 178 is formed with a number of ribs 180 which are directed transversely to the direction of rotation of the stop rings 156 in the V-shaped annular groove. The ribs 180 cooperate with the serration grooves 160 of the lower one of the stop rings 156 when the second barb 174 engages the adjustment projection 166 so that the stop ring 156 is at its smaller circumference. In this state, the lower stop ring 156 is effectively clamped and prevented from rotating. The cooperation of the serrations on the end surfaces 162 of the stop rings 156 prevents the upper one of the stop rings 156 from rotating with respect to the lower one of the stop rings 156 when the second barb 174 of the upper stop ring 156 engages the adjustment projection 166 of the upper stop ring 156.

For cooperation with the interfering projections 164 of the stop rings 156 so as to limit the extent of angular rotation of the adjustment ring 126, the adjustment ring 126 is formed with a tab 182 which extends toward, but terminates before, the beveled annular surface 176, as is best shown in FIG. 1. The projections 164, 166 of the stop rings 156 extend beyond the V-shaped annular groove and therefore extend into the path of travel of the tab 182. Thus, the range of angular rotation of the adjustment ring 126 is limited by the angular positions of the stop rings 156.

In operation of the limit stop arrangement just described, the stop rings 156 are set with their first barbs 172 engaging the adjustment projections 166 so that the circumferences of the stop rings 156 are relatively large and the stop rings 156 are free to rotate independently in the V-shaped annular groove. The operator then sets the greater of the two preset depths of cut. The lower stop ring 156 is then moved so that its interfering projection 164 abuts the tab 182. The adjustment tab 170 is then manipulated so that the second barb 174 engages the adjustment projection 166 of the lower stop ring 156. This causes the lower stop ring 156 to be clamped to the base 108 by means of the ribs 180 and the serration grooves 160. Next, the adjustment ring 126 is moved to set the shallower depth of cut. The upper stop ring 156 is then moved so that its interfering projection 164 abuts the tab 182. Its adjustment tab 170 is then manipulated so that the second barb 174 engages the adjustment projection 166. This clamps the upper stop ring 156 to the lower stop ring 156 by means of the serrations on the end surfaces 162. Thereafter, the operator can quickly change the depth of cut between the preset deeper and shallower depths of cut, as defined by the positions of the two stop rings 156, by rotating the adjustment ring 126 until the tab 182 abuts against the respective interfering projection 164.

Accordingly, there has been disclosed an improved depth of cut adjustment mechanism for a router. While an exemplary embodiment has been disclosed herein, it will be appreciated by those skilled in the art that various modifications and adaptations to the disclosed embodiment may be made and it is only intended that this invention be limited by the scope of the appended claims.

I claim:

1. A router comprising:

a motor housing with an external cylindrical portion;

a base with a cylindrical bore for slidably receiving therein said cylindrical portion of said motor housing;

means for preventing relative rotation between said motor housing and said base;

rotatable depth of cut adjustment means surrounding and cooperating with said motor housing and said base for effecting relative longitudinal displacement of said motor housing with respect to said base; and means for adjustably setting limits on the range of angular rotation of said rotatable depth of cut adjustment means including:

a first beveled annular surface on said adjustment means at one longitudinal end thereof;

a second beveled annular surface on one of said motor housing and said base adjacent said first beveled annular surface, said first and second beveled annular surfaces together forming a V-shaped annular groove;

a tab on said adjustment means extending toward and terminating before said first beveled annular surface;

a first generally circular stop ring rotatable along said annular groove, said first stop rinq including a first interfering projection extending into the path of travel of said adjustment means tab;

a second generally circular stop ring rotatable along said annular groove adjacent said first stop ring, said second stop ring including a second interfering projection extending into the path of travel of said adjustment means tab; and means for setting the angular positions of said first and second stop rings along said annular groove with said first and second projections flanking said adjustment means tab so that said projections define limits on the extent of angular rotation of said adjustment means.

2. The router according to claim 1 wherein said stop rings setting means includes:

first securing means for securing said first stop ring to said second beveled annular surface; and second securing means for securing said second stop ring to said first stop ring.

3. The router according to claim 2 wherein said first stop ring includes means for adjusting the circumference of said first stop ring and said first securing means includes complementary mating surface regions formed on said first stop ring and said second beveled annular surface so that when the circumference of said first stop ring is adjusted below a predetermined circumference said surface regions engage with each other and said first stop ring is prevented from rotating along said annular groove.

4. The router according to claim 3 wherein said complementary mating surface regions comprise at least one projecting rib on said second beveled annular surface directed transversely to the direction of rotation of said first stop ring and a plurality of interfering grooves formed on said first stop ring, said interfering grooves being sized and oriented so that one of said interfering grooves engages said at least one projecting rib when the circumference of said first stop ring is less than said predetermined circumference.

5. The router according to claim 4 wherein said first and second stop rings include surfaces which abut each other and said second securing means includes complementary mating formations on said abutting surfaces.

6. The router according to claim 5 wherein said abutting surfaces are serrated.

7. The router according to claim 4 wherein said complementary mating surface of said first stop ring is serrated to form said plurality of interfering grooves.

8. The router according to claim 3 wherein said first stop ring is resilient and is formed with an opening between two opposed ends, said circumference adjusting means joining said two ends with a selective spacing therebetween.

9. The router according to claim 8 wherein said circumference adjusting means includes:

an adjustment projection on one of said ends, said adjustment projection being formed with a circumferentially directed opening; and a tab on the other of said ends, said tab being circumferentially directed toward said adjustment projection and adapted to extend through said projection opening, said tab being formed with two interfering barbs sized and spaced so that when said tab extends through said adjustment projection opening with a first of said barbs engaging said adjustment projection the circumference of said first stop ring is sufficiently large that said first stop ring is free to rotate along said groove and when said tab extends through said adjustment projection opening with a second of said barbs engaging said adjustment projection the circumference of said first stop ring is below said predetermined circumference so that said first stop ring is prevented from rotating along said annular groove.

10. The router according to claim 9 wherein said first interfering projection of said first stop ring is located on said other end and said tab is secured to said first interfering projection.

11. The router according to claim 10 wherein said complementary mating surface regions comprise at least one projecting rib on said second beveled annular surface directed transversely to the direction of rotation of said first stop ring and a plurality of interfering grooves formed on said first stop ring, said interfering grooves being sized and oriented so that one of said interfering grooves engages said at least one projecting rib when the circumference of said first stop ring is less than said predetermined circumference.

12. The router according to claim 11 wherein said first and second stop rings include surfaces which abut each other and said second securing means includes complementary mating formations on said abutting surfaces.

13. The router according to claim 12 wherein said abutting surfaces are serrated.

14. The router according to claim 13 wherein said second stop ring is identical to said first stop ring and when positioned in said groove is rotated 180° with respect to said first stop ring about an axis along a diameter of said annular groove.

15. The router according to claim 11 wherein said complementary mating surface of said first stop ring is serrated to form said plurality of interfering grooves.

* * * * *